United States Patent [19]

Baker

[11] 3,898,552

[45] Aug. 5, 1975

[54] DC STATIC SWITCH CIRCUIT WITH IMPROVED TRANSISTOR SURGE CURRENT PASS CAPABILITY

[75] Inventor: Donal E. Baker, Elida, Ohio

[73] Assignee: Westinghouse Electric Corporation, Pittsburgh, Pa.

[22] Filed: Feb. 21, 1974

[21] Appl. No.: 444,588

[52] U.S. Cl. .................................. 323/9; 317/33 R

[51] Int. Cl.² .......................................... G05F 1/58

[58] Field of Search ........ 307/202, 255; 317/16, 20, 317/31, 33 R; 323/9

[56] References Cited

UNITED STATES PATENTS

| | | | |
|---|---|---|---|
| 3,654,518 | 4/1972 | Phelps et al. | 323/9 X |
| 3,710,231 | 1/1973 | Baker | 323/9 |

*Primary Examiner*—A. D. Pellinen

*Attorney, Agent, or Firm*—G. H. Telfer

[57] ABSTRACT

A DC static switch having a main switch transistor whose drive circuit includes a particular arrangement of complimentary polarity transistors connected so as to maintain low power dissipation while increasing the surge current pass capability of the main transistor.

4 Claims, 2 Drawing Figures

PATENTED AUG 5 1975 3,898,552

DC STATIC SWITCH CIRCUIT WITH IMPROVED TRANSISTOR SURGE CURRENT PASS CAPABILITY

BACKGROUND OF THE INVENTION

The invention relates to DC static switching circuits, particularly transistor circuits, for use in electrical power systems.

A single transistor can be used to switch power between a source and a load. With typical transistors currently available having a saturation voltage of 0.25 volts at 1 ampere current level and a minimum beta at saturation of 40 for a 1 ampere current level, then a 1 ampere rated switch would have a total dissipation of about 1 watt for a supply voltage of 30 volts. This can be shown by calculation to equal an electrical efficiency of 96.75 percent. This efficiency is adequate for many power switching designs. Ratings of up to 10 amperes can be adequately satisfied by selection of transistors now available.

Beyond the rating of about 10 amperes, the saturation voltage and beta at saturation of commercially available transistors becomes inadequate and transformer-oscillator drive circuits must be used as is disclosed in U.S. Pat. No. 3,710,231, filed Jan. 9, 1973 by the present inventor.

The problem with the prior art circuitry as described is that it is not capable of passing surge current levels greater than the rated current for which it is designed without incurring additional power loss. Many power switching applications require that more than rated current be passed for fault clearing, non-linear loads, motor starting, and other purposes. For the case in which the current is three times the rated current, the power dissipation for a 30 volt source and other conditions the same as previously described would be 2.5 watts or an electrical efficiency of 92.25 percent. Thus the increase in base drive current to make it possible to pass an overload of a factor of three more than doubles the power dissipation and reduces the efficiency of the switch to an undesirable level.

It is also known to reduce the power dissipation by reducing the required base drive using the well-known Darlington circuit arrangement. Such circuits are capable of passing a 400 percent rated current with the same base drive losses as the first example. Hence here we can achieve good surge capability with no increase in the base drive losses. However, the saturation voltage for a Darlington circuit cannot be forced to less than 1.2 volts. This level is considered unacceptable for sophisticated power controller applications in which the intention, of course, is to achieve with static components the performance of electromechanical relays, which have essentially zero voltage drop when on. Modifications of the basic Darlington configuration can be made in an attempt to achieve the desired performance, some of which have performed adequately. Reference to U.S. Pat. Nos. 3,671,833 and 3,678,291 is made for showing art on transistor switching circuits generally of the Darlington type modified by a diode coupled between the transistors and adjusted so that the diode is back biased when in the normal load current condition and forward biased when the load requires a high current.

Thyristors are also known static power switching devices with good surge capability and other good characteristics. Those available, however, have over 1 v. saturation voltage and, particularly in DC circuits, require relatively complex arrangements for turn off.

The present invention provides alternative circuit configurations having even greater surge current capabilities with no deterioration in efficiency as compared with known prior art.

SUMMARY OF THE INVENTION

In accordance with this invention, a DC static switch is provided having a main switch transistor whose drive circuit includes a particular arrangement of complementary polarity transistors connected so as to maintain low power dissipation while increasing the surge current pass capability of the main transistor.

It can be shown that by the use of readily available transistors the circuit of this invention performs with a power dissipation of 1 watt, efficiency of 96.75 percent and a surge current pass capability of 1600 amperes for a 1 ampere rating.

DESCRIPTION OF THE PREFERRED EMBODIMENT

Figure 1:
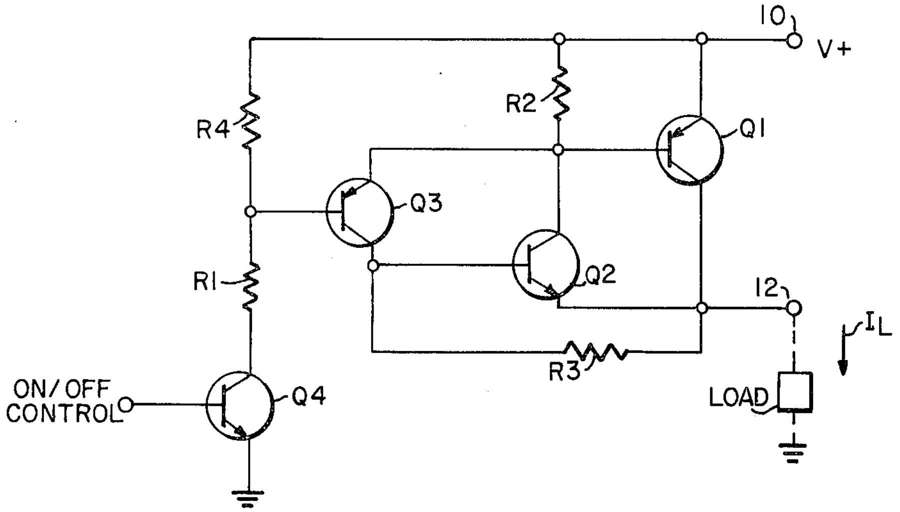
FIG. 1 is a circuit schematic of one embodiment of the invention.

Referring to FIG. 1, there is shown a static switch apparatus for controlling the application of DC power from a direct voltage source, V+, to a load. The apparatus comprises a first transistor Q1 that is the main power switch of the circuit, second and third transistors Q2 and Q3 that are the primary base drive transistors for Q1 and a fourth transistor Q4 that is incidental to the drive circuit configuration but which is shown as an example of a constant current source suitable for being energized by the application of on/off control signals to initiate operation of the switch.

The first and third transistors Q1 and Q3 are of a first polarity while the second and fourth transistors in this example are of opposite polarity. For the case in which the direct voltage source has a positive polarity as shown, transistors Q1 and Q3 are PNP transistors and transistors Q2 and Q4 are NPN transistors.

Each of the transistors has an emitter, a base, and a collector. Various particular connections of these elements are important to the invention. They include:

1. Q1 emitter to a first terminal 10 for connection to source V+,
2. Q1 collector connected to a second terminal 12 for connection to the load,
3. Q1 base, Q2 collector and Q3 emitter,
4. Q2 emitter and Q1 collector
5. Q2 base and Q3 collector The transistor Q4 has its collector connected through a resistor R1 to the base of Q3 for applying input signals thereto. The emitter of Q4 is maintained at a reference potential or ground and its base is connected to a source of on/off control signals. The arrangement of Q4 is that of a constant current source that has been previously used.

There also occur in the circuit base-emitter resistors R2, R3 and R4 across the respective bases and emitters of each of the individual transistors Q1, Q2 and Q3 as is conventional.

The circuit shown has only one base drive resistor. This circuit can also be implemented with a second resistor R5 from the base of Q1 to the collector of Q4. The use of such an additional resistor tends to lower the surge capability for a fixed value of $I_{B1} = I_{R1} + I_{R5}$ where $I_{B1}$ is the Q1 base current, and $I_{R1}$ and $I_{R5}$ are the currents through those respective resistors.

In the operation of the circuit of FIG. 1 when Q1 is fully saturated (i.e., load current $I_L \leq 1$ amp) transistors Q2 and Q3 are not functioning as transistors. This is because the collector-emitter terminals of Q2 are reverse biased slightly (by Q1 being saturated) thereby rendering it inoperative. The collector-emitter terminals of Q3 are reverse biased slightly through R3 (by Q1 being saturated) thereby rendering it inoperative also. Hence, the maximum base drive current through Q1 is established by the voltage across R1 only and therefore it functions as a lone transistor (essentially with no aid from Q2 or Q3). Rated condition losses and efficiency can be calculated as described herein.

Figure 2:
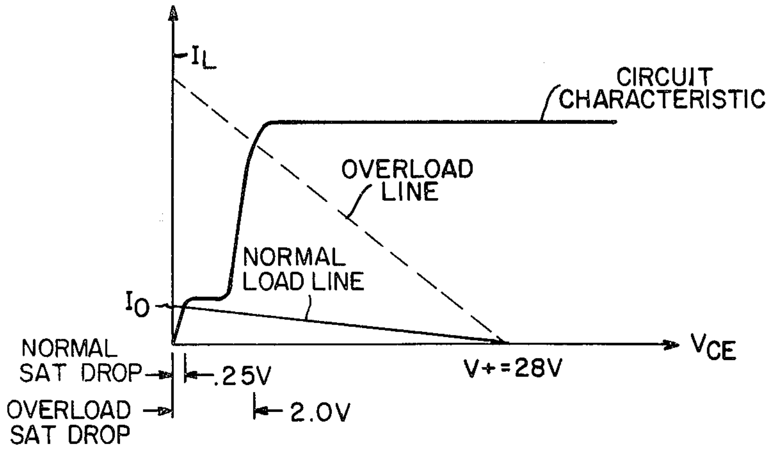
FIG. 2 is a graph showing performance characteristics.

If, however, the load current increases to a point which causes Q1 to start pulling out of saturation then Q2 and Q3 become forward biased and begin functioning as transistors. The maximum base drive to Q1 is now determined by $I_{B1}$ times the beta of Q2 times the beta of Q3. This increased base current available to Q1 holds the Q1 saturation voltage to approximately 2.0 volts maximum until the load current and hence the base current demand for Q1 are so large that Q2 and Q3 begin pulling out of saturation. It is this load current level which corresponds to $I_{B1}$ times beta Q1 times beta of Q2 times beta of Q3. Any further increase in load will cause the circuit to pull out of saturation while maintaining essentially fixed load current. This is illustrated by FIG. 2. The 2.0 volt intermediate saturation voltage is the sum of Q1 base-emitter voltage, Q2 base-emitter voltage and Q3 collector-emitter voltage.

With the circuit as shown the following performance results.

Assume the following characteristics, as can be provided with commercially available components:

$V+ = 30$ v. DC $I_o$ (load current = 1 ampere, nominal rating)

Beta for each Q1, Q2, and Q3 = 40

$V_{sat}$ for Q1 = 0.25 v at 1 ampere $I_{B1}$ (base drive current) = 0.025 amperes.

Then, the power dissipation $$Pd = (V_{sat})(I_o) + (V+)(I_{B1}) = 1 \text{ watt}$$

The efficiency at rated load current is $$\left(1 - \frac{Pd}{P_{in}}\right) 100\% = 96.75\%$$

where $$P_{in} = (V+)(I_o + I_{B1}) = (V+)(1 + 0.025).$$

Also it can be calculated for the given parameters that the surge current is $$I_{B1}(\text{beta } Q1)(\text{beta } Q2)(\text{beta } Q3) = 1600 \text{ amperes.}$$

This calculated value of surge current exceeds normal requirements and permits selection of transistors whose beta need not be controlled while achieving good characteristics.

The example illustrated is one in which the main switch transistor Q1 is of PNP configuration. The circuit is however realizable with Q1 of NPN polarity with all polarities reversed and essentially the same performance capabilities.

The graph of FIG. 2 illustrates the nature of performance with the circuits of this invention. For normal load conditions the saturation drop is low (0.25 v). For overload the saturation drop increases to approximately 2 volts and the switch passes much higher currents.

The following table is provided by way of further example to give suitable components for use in the circuit shown in FIG. 1.

| | |
|---|---|
| Transistor Q1 | Type 2N6331 (T.I.) |
| Transistor Q2 | Type 2N3442 (Motorola) |
| Transistor Q3 | Type MJ3584 (Motorola) |
| Resistor R1 | 1100 ohms, 1 watt |
| Resistor R2 | 510 ohms, 1/2 watt |
| Resistor R3 | 1000 ohms, 1/2 watt |
| Resistor R4 | 5100 ohms, 1/2 watt |

With the foregoing transistors the circuit provides an empirically determined surge capability of 40 amperes (for 1 ampere nominal rating). This results from the more limited than ideal transistor characteristics but is a distinct improvement over prior known arrangements.

It is therefore seen that a particular drive current amplifier arrangement provides the desired improvement in surge capabilities without sacrificing other qualities.

What is claimed is:

1. Static switch apparatus for controlling the application of DC power from a direct voltage source to a load and comprising:

a first transistor of a first polarity having an emitter, a base, and a collector with a first terminal connected to said emitter for connection to the source of power and a second terminal connected to said collector for connection to the load;

a second transistor of an opposite polarity to said first polarity having an emitter, a base, and a collector;

said first transistor base and said second transistor collector being interconnected;

said second transistor emitter being directly connected with said second terminal; a third transistor of said first polarity having an emitter, a base, and a collector;

said second transistor collector and said thrid transistor emitter being interconnected;

said second transistor base and said third transistor collector being interconnected; and said third transistor base having means for applying input signals thereto.

2. The subject matter of claim 1 wherein:

said first and third transistors are of PNP polarity and said second transistor is of NPN polarity.

3. The subject matter of claim 1 wherein:

the static switch apparatus is connected in circuit with a direct voltage source and a load and said direct voltage source is of a polarity to forward bias said first transistor emitter in relation to said first transistor base.

4. The subject matter of claim 1 further comprising:

a fourth transistor of said opposite polarity having an emitter, a base, and a collector;

said fourth transistor collector being interconnected through a resistor to said third transistor base;

said fourth transistor emitter being connected to a reference potential, and said fourth transistor base being connected to a third terminal connected thereto for connection to a source of on/off signals.

* * * * *